United States Patent
Smith et al.

(10) Patent No.: US 6,739,631 B2
(45) Date of Patent: May 25, 2004

(54) TORQUE-LIMITING BOLT-AND-NUT ASSEMBLY

(76) Inventors: Radford S. Smith, 111 Gaddy Rd., Lynchburg, VA (US) 24502; Roger D. Woody, 1446 Rocky Branch Dr., Forest, VA (US) 24551

( * ) Notice: Subject to any disclaimer, the term of this patent is extended or adjusted under 35 U.S.C. 154(b) by 0 days.

(21) Appl. No.: 10/238,577

(22) Filed: Sep. 11, 2002

(65) Prior Publication Data

US 2004/0046389 A1 Mar. 11, 2004

(51) Int. Cl.[7] ............ F16L 19/00; F16B 31/00; F16B 37/14
(52) U.S. Cl. ............ 285/337; 285/4; 285/404; 285/421; 411/4; 411/5; 411/375.5; 411/372.6; 411/373
(58) Field of Search ............ 285/337, 374, 285/4, 421, 404, 90; 411/1, 2, 3, 4, 5, 410, 373, 372.5, 372.6

(56) References Cited

U.S. PATENT DOCUMENTS

| | | | |
|---|---|---|---|
| 3,191,486 A | * | 6/1965 | Gibbens .......... 411/4 |
| 3,370,341 A | * | 2/1968 | Allsop ............ 29/413 |
| 3,595,124 A |   | 7/1971 | Lindstrand et al. |
| 3,602,976 A | * | 9/1971 | Grube .......... 29/407.03 |
| 3,728,933 A | * | 4/1973 | Grube ............ 411/5 |
| 3,812,757 A |   | 5/1974 | Reiland |
| 3,897,112 A | * | 7/1975 | Walther et al. ....... 301/13.2 |
| 4,092,036 A |   | 5/1978 | Sato et al. |
| 4,484,849 A | * | 11/1984 | Klimowicz ........ 411/397 |
| 4,627,724 A |   | 12/1986 | Cameron |
| 4,627,774 A |   | 12/1986 | Bradley |
| 4,779,900 A |   | 10/1988 | Shumard |
| 4,848,808 A | * | 7/1989 | Pannell et al. ........ 285/337 |
| 4,896,903 A |   | 1/1990 | Shumard |
| 4,902,036 A |   | 2/1990 | Zander et al. |
| 5,228,250 A | * | 7/1993 | Kesselman ........... 52/98 |
| 5,287,029 A | * | 2/1994 | Krouse ............ 310/89 |
| 5,544,922 A |   | 8/1996 | Shumard et al. |
| 5,630,687 A | * | 5/1997 | Robinson ........ 411/372.6 |
| 5,772,252 A |   | 6/1998 | Malani |
| 5,947,527 A |   | 9/1999 | Carter |

FOREIGN PATENT DOCUMENTS

DE           37 38 409 A1   *   5/1989   .......... 285/337

OTHER PUBLICATIONS

"Mechanical Joint 360° Wedge Type Restraint System Designed for Ductile Iron and C900 PVC Pipe", Allgrip™ Series 3600 and PVCGrip™ Series 3500, Starpipe Products, pp. 5, 6, and 9.

* cited by examiner

*Primary Examiner*—James M. Hewitt
(74) *Attorney, Agent, or Firm*—Burns, Doane, Swecker & Mathis, LLP

(57) ABSTRACT

A torque-limiting bolt-and-nut assembly is provided for actuating a pipe-pressing member in order to secure two pipe ends together. The bolt includes a threaded shank, a secondary drive head, and a shearable drive head designed to be sheared-off by a torque exceeding a predetermined value. A recess is formed between the shearable drive head and the second drive head. The nut is mounted on the shearable drive head and is configured for transmitting torque to the shearable drive head from a manual tool. A nut includes a connection structure extending into the recess for resisting dislodgement of the nut from the bolt. The shearable drive head has at least four sides, all of the sides being of equal length, and the number of the sides being an even number.

14 Claims, 3 Drawing Sheets

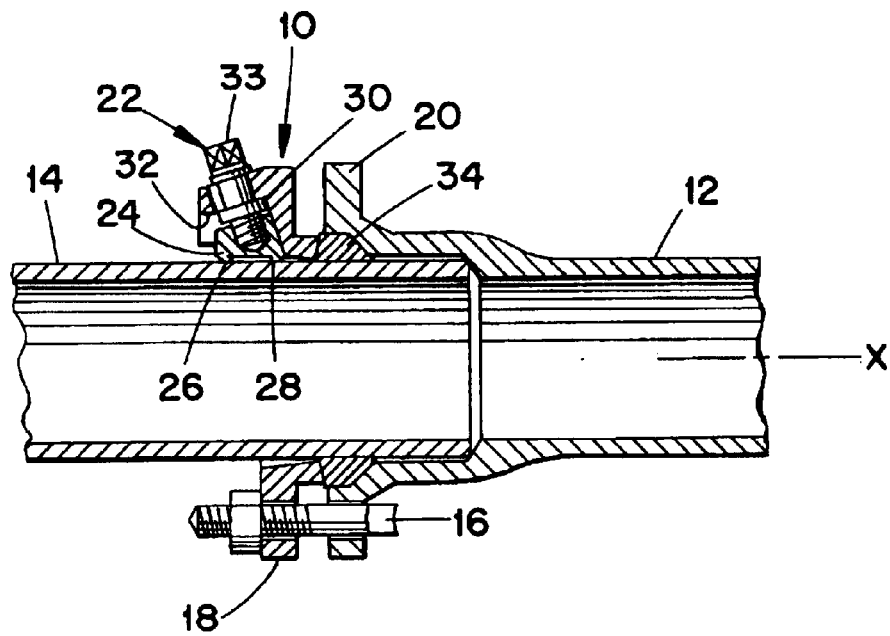
FIG. 1
(PRIOR ART)
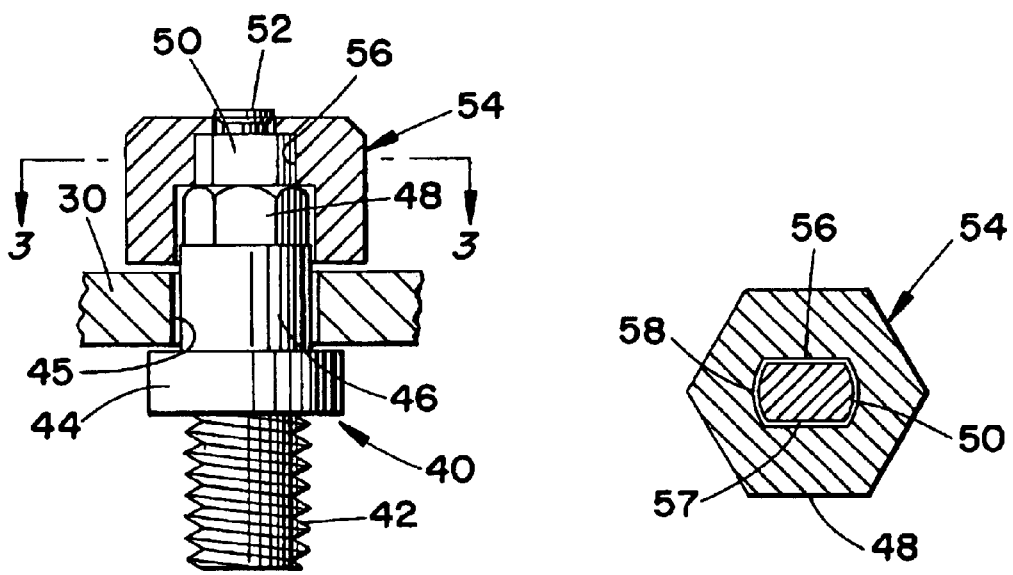
FIG. 2
(PRIOR ART)
FIG. 3
(PRIOR ART)

TORQUE-LIMITING BOLT-AND-NUT ASSEMBLY

BACKGROUND OF THE INVENTION

The present invention relates to a torque-limiting bolt-and-nut assembly which is capable of being tightened only to a selected torque, especially for use in securing pipe ends together.

Bolt-and-nut assemblies are used to secure pipe ends together at a pipe junction. In that regard, attention is directed to FIG. 1 depicting a conventional pipe junction holder 10 for securing together the ends of two pipes 12, 14. Such a holder, disclosed in U.S. Pat. No. 4,092,036, includes a plurality of bolts 16 (only one depicted) which connect a ring 18 to a flange 20 of one of the pipes 12. The ring 18 carries a plurality of inclined bolts 22 (only one shown). Each bolt is connected to a respective pipe pressing member 24 to force edges 26, 28 thereof against an outer periphery of the pipe 14. Each inclined bolt 22 includes a flange 30 which bears against a slant surface 32 of the ring 18. By manually rotating the drive heads 33 of the bolts 22, the pressing members 24 are tightened against the ring, causing the ring 18 to press a packing member 34 against the ends of the two pipes to sealingly secure the pipe ends together. The slant surface 32 is inclined relative to the pipe axis, such that if the pipe ends try to separate axially from one another, the pipe pressing members 24 will be urged more forcefully against the pipe 14 to more vigorously resist the separation.

It will be appreciated that if the inclined bolts 22 are excessively rotated by a technician, the pressing member 24 may be forced too hard against the pipe 14, producing damage thereto. To prevent that from occurring, it has been proposed to utilize bolts that possess a torque-limiting structure. Exemplary of such bolts are those disclosed in U.S. Pat. Nos. 3,595,124; 3,812,757; and 4,627,774, wherein the driving head of the bolt is designed to shear-off when a predetermined torque level is exceeded.

In addition, as shown in U.S. Pat. No. 4,627,744, and in FIGS. 2 and 3 herein, it is conventional to provide an overlying protective nut on the shearable drive head to prevent that shearable drive head from breaking off prematurely if subjected to an accidental impact. In that regard, and with reference to FIGS. 2 and 3, a bolt 40 includes a threaded shank 42, a collar 44, a cylindrical intermediate segment 46 extending through a respective hole 45 formed in the flange 30, a secondary head 48, a shearable drive head 50, and a retaining rivet 52 for retaining the protective nut 54 in place. The nut 54 includes a recess 56 configured correspondingly to the drive head 50 to transmit torque to the drive head when the nut is rotated by a turning tool (e.g., a wrench). The nut extends axially sufficiently far to enable a free end thereof to overlie a portion of the cylindrical intermediate segment 46.

Among the shortcomings of such prior art is the fact that if the rivet 52 becomes broken and the nut 54 becomes accidentally dislodged from the bolt 40, the turning torque necessary to rotate the drive head must be applied directly to the drive head. However, the drive head 50 has a cross-sectional shape which is not of the traditional shape for which standard wrenches are designed, (i.e., a rectangular shape formed by two long sides 57 joined by two short sides 58). Thus, the drive head is not adapted to be gripped by wrenches of the type normally found in the tool box of a typical technician. Since the technician will be located in the field where the pipes are to be joined, it may be difficult for the technician to locate a wrench that is adapted to the shape of the drive head. As a result, the technician may resort to applying torque to the secondary drive head 48 which has a more traditional shape, but which is not of the shearable type, thereby giving rise to the risk of overtightening the pipe pressing member, as discussed earlier herein in connection with FIG. 1.

Therefore, it would be desirable to provide a torque-limiting bolt-and-nut assembly having a shearable drive head which can be driven by tools that are traditionally found in technicians toolboxes. It would also be desirable to provide a simpler way of attaching a protective nut to the bolt of such an assembly.

SUMMARY OF THE INVENTION

Accordingly, the present invention provides a torque-limiting bolt-and-nut assembly. The bolt includes a connector portion including a threaded shank, a secondary drive head integrally joined to an end of the connector portion, and a shearable drive head integrally joined to the secondary drive head by a shear-off section designed to be sheared-off by a torque exceeding a predetermined value. A recess is formed in the bolt between the shearable drive head and the secondary drive head. A nut is affixed on the shearable drive head and is configured for transmitting torque to the shearable drive head from a tool.

Preferably, the nut includes a connection structure extending into the recess for resisting dislodgement of the nut from the bolt.

Also, preferably, the shearable drive head has at least four sides as viewed in a cross-sectional plane oriented perpendicular to a center axis of the bolt. All of the sides of the drive head are of equal length, and the number of sides is an even number.

BRIEF DESCRIPTION OF THE DRAWINGS

The objects and advantages of the invention will become apparent from the following detailed description of preferred embodiments thereof in connection with the accompanying drawings in which like numerals designate like elements and in which:

FIG. 1 is a longitudinal sectional view taken through a conventional pipe junction.

FIG. 2 is a side view, partially in section, of a conventional torque-limiting bolt-and-nut assembly.

FIG. 3 is a sectional view taken along the line 3—3 in FIG. 2.

FIG. 8 is a sectional view taken along the line 8—8 of FIG. 7.

DETAILED DESCRIPTION OF PREFERRED EMBODIMENTS OF THE INVENTION

Figure 4:
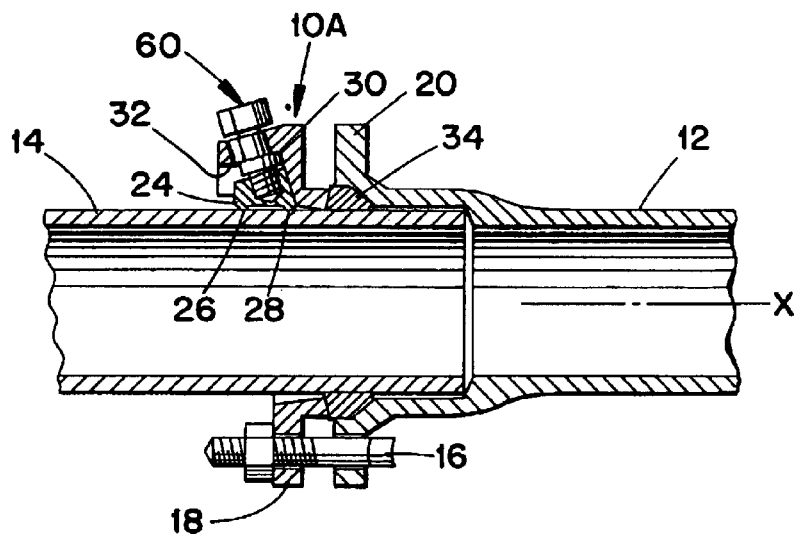
FIG. 4 is a view similar to FIG. 1 of a pipe junction employing a torque-limiting bolt-and-nut assembly according to the present invention.

Depicted in FIG. 4 is a pipe junction holder 10A similar to that described earlier in connection with FIG. 1, except that a torque-limiting bolt-and-nut assembly 60 according to the present invention is utilized in lieu of the torque-limiting bolt 22.

To reiterate, the pipe junction holder 10A is employed for securing together the ends of two pipes 12, 14. The holder includes a plurality of bolts 16 (only one depicted) which connect a ring 18 to a flange 20 of one of the pipes 12. The ring 18 carries a plurality of inclined torque-limiting bolt-and-nut assemblies 60 (only one shown). The torque-limiting assemblies 60 function to force edges 26, 28 of the pressing members 24 against an outer periphery of the pipe 14. Each torque-limiting assembly 60 includes a flange 68 which bears against a slant surface 32 of the ring 18. By manually rotating the torque-limiting assembly 60, the ring 18 is caused to press a packing member 34 against the ends of the two pipes to sealingly secure the pipe ends together. The slant surface 32 is oriented at an oblique angle relative to a center axis of the ring, such that if the pipe ends try to separate axially from one another, the pipe pressing members 24 are urged more vigorously against the pipe 14 to resist the separation.

The bolt 62 has a connector portion 65 which includes a threaded shank 66, the flange 68, and a cylindrical intermediate segment 70. The bolt 62 further includes a secondary head 72 integrally joined to one end of the connector section, and a shearable drive head 74. The shearable drive head 74 and the secondary head 72 are spaced apart axially along a center axis Y of the bolt 62 and are integrally joined together by a shear segment 76. The shear segment has a smaller cross section than the shearable drive head 74, wherein a recess 79 is formed between the drive head 74 and the secondary head 72, the recess extending around an outer periphery of the shear segment.

The shearable drive head 74 has a traditional cross-sectional shape for which a turning tool (wrench) is normally found in the toolbox of a typical field technician. That is, the head 74 has sides 74a (see FIG. 6), all of which are of equal length, there being at least four of the sides, with the number of sides being an even number, e.g., four, six, eight, ten, twelve, etc. In the preferred embodiment shown in FIGS. 5–9, there are six equi-length sides 74a.

Figure 5:
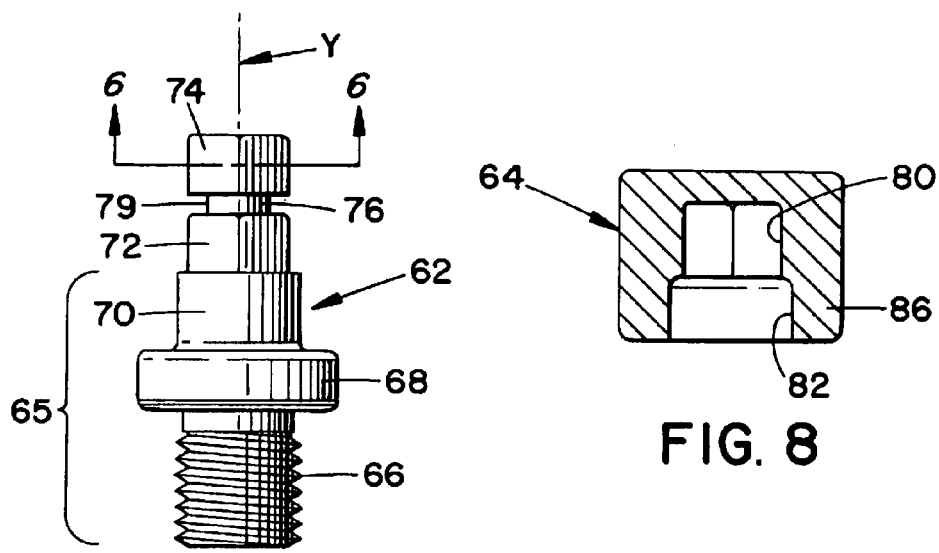
FIG. 5 is a side elevational view of a first embodiment of a bolt according to,the present invention.
Figure 6:
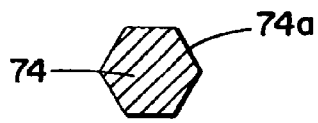
FIG. 6 is a sectional view taken along the line 6—6 in FIG. 5.
Figure 7:
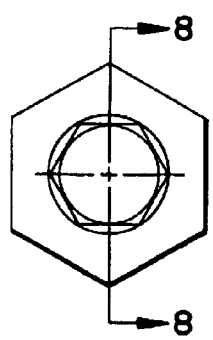
FIG. 7 is a bottom plan view of a nut which is to be secured to the bolt of FIGS. 5–6.

In FIG. 5 the shearable drive head 74 is shown as being of the same size and shape as the secondary head 72, but that need not be the case. Rather, the shearable drive head 74 could be of different size and/or shape than the secondary head 72.

Figure 9:
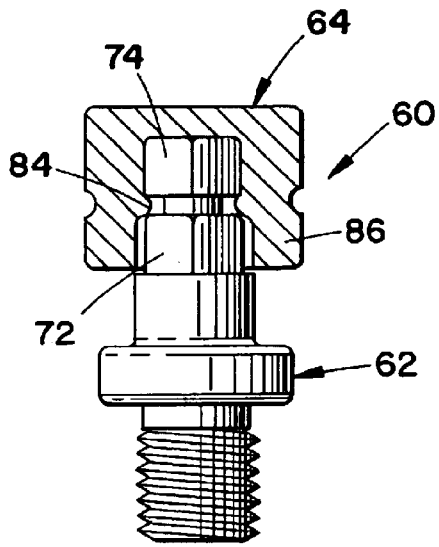
FIG. 9 is a side elevational view, partly in section, of a torque-limiting bolt-and-nut assembly after the nut of FIGS. 7 and 8 has been secured to the bolt of FIGS. 5–6.

The nut 64 includes an internal drive cavity 80 having a cross sectional shape corresponding to that of the drive head 74. The nut 64 also includes a cavity 82 having a larger cross section than the secondary head 72. The nut includes a connection structure extending into the recess 79 formed between the drive head 74 and the secondary head 72. As shown in FIG. 9, such connection structure comprises an indentation 84 pressed into the recess 79 by inwardly swaging part of a sleeve portion 86 of the nut 64. Thus, the indentation enters the recess 79, which is empty so as to be able to receive that indentation, and prevents the nut from becoming axially dislodged from the bolt 62 without the need for providing the bolt with an extra section to form a rivet, or for performing a rivet-deforming step, as in the case of the prior art bolt of FIG. 2. The indentation 84 could be circumferentially continuous to form a ring shaped indentation, or there could be a plurality of circumferentially spaced apart indentations.

The torque-limiting bolt-and-nut assembly 60 is used in a conventional manner to force the edges 26, 28 of the pressing member 24 against the pipe section 74. That is, a technician applies a wrench to the nut 64 and imparts a torque thereto which is transmitted by the drive cavity 80 to the shearable drive head 74. The torque continues to be applied until the shear segment 79 of the bolt 62 shears-off. The nut and the drive head 74 are then discarded.

In the event that the nut 64 has become accidentally dislodged from the bolt 62 prior to tightening of the bolt 62, it would be necessary for the technician to obtain a wrench suited to rotate the drive head 74 directly. That should not require that the technician leave the site since the drive head has a traditional shape, i.e., an even number of at least four equal-length sides, making it likely that the technician has a suitable wrench in his/her toolbox.

Figure 10:
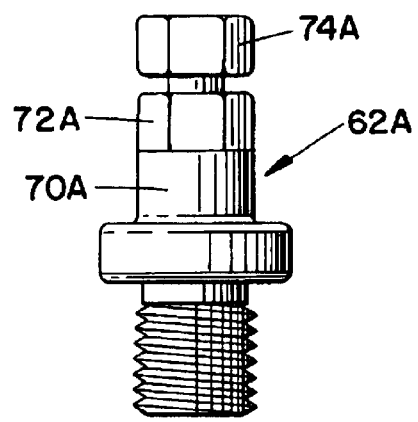
FIG. 10 is a side elevational view of a nut according to a second embodiment of the present invention.

In FIG. 5 the secondary head 72 is shown to be of smaller cross section that the cylindrical intermediate segment 70. However, in lieu of that relationship, the cross-section of the secondary head 72A could be as large as (or even larger than) that of the cylindrical intermediate segment 70A, as is the case in an alternative embodiment of a bolt 62A shown in FIG. 10. The shearable drive head 74A could also be larger than the cylindrical intermediate segment 70A.

Figure 11:
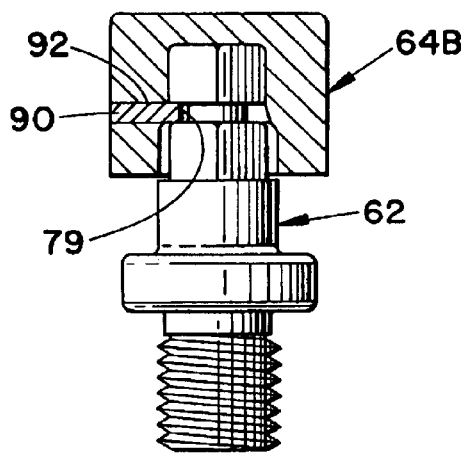
FIG. 11 is a side elevational view, partly in section, depicting another way of securing the nut to the bolt according to the present invention.

Instead of swaging the nut to form the connection structure that secures the nut to the bolt, the nut could include a pin 90 which extends through a lateral hole 92 formed in the nut 64B and enters the recess 79 as shown in FIG. 11.

Another possible alternative would be to use an adhesive to secure the nut to the bolt, wherein some of the glue enters the recess 79 and hardens to form a connection structure that secures the nut to the bolt.

Figure 12:
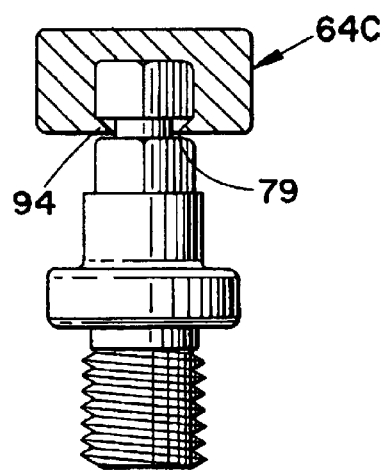
FIG. 12 is a side elevational view depicting yet another way of securing the nut to the bolt according to the present invention.

Still another way of securing the nut involves swaging, but instead of swaging an intermediate portion of a skirt of the nut, a free end 94 of the nut 64C could be swaged, as shown in FIG. 12. In this embodiment, the length of the nut has been shortened to make it possible for the free end of the skirt to enter the recess 79.

Although the present invention has been described in connection with preferred embodiments thereof, it will be appreciated by those skilled in the art that additions, deletions, modifications, and substitutions not specifically described may be made without departing from the spirit and scope of the invention as defined in the appended claims.

What is claimed is:

1. A torque-limiting bolt-and-nut assembly comprising:
   a bolt including:
      a connector portion including a threaded shank,
      a secondary drive head integrally joined to an end of the connector portion,
      a shearable drive head integrally joined to the secondary drive head by a shear-off section designed to be sheared-off by a torque exceeding a predetermined value, and
      a recess formed between the shearable drive head and the secondary drive head and disposed around an outer periphery of the shear-off section; and
   a nut mounted on the shearable drive head and configured for transmitting torque to the shearable drive head from a tool, the nut including a connection structure extending into the recess for resisting dislodgement of the nut from the bolt.

2. The torque-limiting bolt-and-nut assembly according to claim 1 wherein the connection structure comprises a portion of the nut pressed into the recess.

3. The torque-limiting bolt-and-nut assembly according to claim 2 wherein the nut extends over the outside of both the shearable drive head and the secondary drive head, and the connection structure comprises a portion of the nut situated between opposite ends of the nut.

4. The torque-limiting bolt-and-nut assembly according to claim 2 wherein the nut extends over the outside of the shearable drive head and includes an end disposed in the vicinity of the recess and pressed into the recess to define the connection structure.

5. The torque-limiting bolt-and-nut assembly according to claim 1 wherein the connection structure comprises a pin extending from a hole of the nut and entering the recess.

6. The torque-limiting bolt according to claim 1 wherein the connection structure comprises a hardened adhesive material.

7. The torque-limiting bolt-and-nut assembly according to claim 1 wherein the shearable drive head has at least four sides as viewed in a cross sectional plane oriented perpendicular to a center axis of the bolt, all of the sides being of equal length, and the number of sides being an even number.

8. The torque-limiting bolt-and-nut assembly according to claim 1 wherein the connector portion further includes a flange disposed between the secondary drive head and threads of the shank.

9. The torque-limiting bolt-and-nut assembly according to claim 1 wherein the recess comprises an annular groove.

10. A pipe junction holder comprising:
an annular ring including a plurality of holes extending therethrough in a direction oriented obliquely relative to a longitudinal axis of the ring, the ring including an internal surface slanted at an oblique angle relative to the longitudinal axis of the ring,
a torque-limiting bolt-and-nut assembly mounted in each hole, each assembly including a bolt and a nut,
the bolt comprising a connector portion, a secondary drive head integrally joined to an end of the connector portion, and a shearable drive head integrally joined to the secondary drive head by a shear-off section, the connector portion including a threaded shank extending through a respective one of the holes, and a flange disposed between the threaded shank and the secondary drive head, the shearable drive head designed to be sheared-off by a torque exceeding a predetermined value, and a recess formed between the shearable drive head and the secondary drive head, the recess extending around an outer periphery of the shear-off section;
the shearable drive head having at least four sides, all of the sides being of equal length as viewed in a cross-sectional plane oriented perpendicularly to a center axis of the bolt, the number of the a,sides being an even number;
pipe-pressing members threadedly attached to the shank of respective ones of the bolts; and
the nut being mounted on the shearable drive head and configured for transmitting torque to the shearable drive head from a tool, the nut including a connection structure extending into the recess for resisting dislodgement of the nut from the bolt.

11. The holder according to claim 10 wherein the connection structure comprises a portion of the nut pressed into the recess.

12. The holder according to claim 11 wherein the nut extends over the outside of both the shearable drive head and the secondary drive head, and the connection structure comprises a portion of the nut situated between opposite ends of the nut.

13. The holder according to claim 11 wherein the nut extends over the outside of the shearable drive head and includes an end disposed in the vicinity of the recess and pressed into the recess to define the connection structure.

14. The holder according to claim 10 wherein the connection structure comprises a pin extending from a hole of the nut and received in the recess.

* * * * *